United States Patent [19]
Redman

[11] Patent Number: 5,028,742
[45] Date of Patent: Jul. 2, 1991

[54] CABLE SHIELD CONNECTOR

[75] Inventor: Dean E. Redman, Austin, Tex.

[73] Assignee: Minnesota Mining and Manufacturing Company, St. Paul, Minn.

[21] Appl. No.: 496,233

[22] Filed: Mar. 20, 1990

[51] Int. Cl.⁵ .................... H02G 15/08; H01R 4/18
[52] U.S. Cl. .................... 174/88 R; 29/868; 29/872; 174/78; 174/88 C; 439/98
[58] Field of Search .................... 174/78, 88 R, 88 C; 29/868, 872; 439/98, 99

[56] References Cited

U.S. PATENT DOCUMENTS

| | | | |
|---|---|---|---|
| 3,564,117 | 2/1971 | Scheffler | 174/78 X |
| 3,701,839 | 10/1972 | Smith | 439/98 X |
| 3,778,749 | 12/1973 | Kapell | 174/78 X |
| 3,915,540 | 10/1975 | Thompson et al. | 174/88 R X |
| 4,025,717 | 5/1977 | Whittingham | 174/88 C |
| 4,026,619 | 5/1977 | Gillemot | 174/88 R X |
| 4,032,205 | 6/1977 | Taj | 174/78 X |

FOREIGN PATENT DOCUMENTS

| | | | |
|---|---|---|---|
| 2271688 | 12/1975 | France | 174/78 |
| 19291 | 2/1977 | Japan | 174/78 |

OTHER PUBLICATIONS

A brochure entitled "Shield Bonding Systems" published by 3M with a copyright date of 1981.
A printed instruction sheet entitled "3M Systems for Splicing and Terminating" published by 3M on or about Feb. 7, 1986.

Primary Examiner—Morris H. Nimmo
Attorney, Agent, or Firm—Gary L. Griswold; Walter N. Kirn; Jack V. Musgrove

[57] ABSTRACT

A device for connecting the grounding shield layer of a cable in a splice connection. A flat strap, such as a mesh of metallic wires, is wrapped at least 270° around the shield layer. The ends of the strap or braid are folded over, forming two generally parallel tails. The central portion of the braid is secured to the shield with a constant force spring, and the free ends of the braid are fastened to the shield layer on the opposite side of the splice. A second braid may be used in a similar manner to bridge the connection across the splice. By providing two tails emanating from a single braid, current surges in the shield layer are divided along two current paths, reducing current density and minimizing failures in the cable shield connection.

15 Claims, 2 Drawing Sheets

CABLE SHIELD CONNECTOR

BACKGROUND OF THE INVENTION

1. Field of the Invention

The present invention generally relates to electrical connectors for shielded cables, and more particularly to a metallic wire braid for connecting or terminating the grounding shield of high-current power cables.

2. Description of the Prior Art

Electrical cables, such as those used for telephone lines, high voltage lines, cable television, etc., can develop faults or breaks in the line due to manufacturing defects or environmental factors. Faults occur both in underground and aerial cables. Rather than replacing an entire section of such a cable, it is expedient to expose a portion of the cable, repair or splice the fault, and place an enclosure about the splice. Splicing of electrical wires is similarly useful 20 in the placement of successive cable sections, and in cable terminations.

As shown in FIG. 1, the construction of coaxial cables, such as those used in high-voltage lines, typically includes a central conductor 1, a primary insulating layer 2, a shielded grounding layer 3, and an outer cable jacket 4. In splicing such cables, it is necessary to provide electrical continuity not only between the central conductors 1 of the two cables, but also between the sections of the grounding shields 3. One prior art connection technique for the splicing of cable shields requires the use of flat wire braids. One such prior art wire braid 5 is illustrated in FIG. 1. The braid 5 is simply wrapped around the shield 3 and held in place by adhesive tape, a constant force spring, or a metallic clamp. One end 6 of braid 5 is then connected to the shield of the other cable. Minnesota Mining & Manufacturing Co. (3M), assignee of the present invention, markets shield connectors, such as the SCOTCHLOK brand 4460 shield bond connector, which utilize flat braids (SCOTCHLOK is a trademark of 3M).

The integrity of the cable shield connection becomes particularly crucial when dealing with currents of 10,000 amperes or more. These currents may be caused by lightning surges (which may reach up to 30,000 amps), or by crossover currents in high-power cables. When such current levels are present, a poor shield connection may result in a failure of shield continuity due to excess current density. While prior art braid connectors provide a low-resistance electrical connection for cable shields (on the order of $2.5 \times 10^{-4}$ ohm/foot), high current levels can nevertheless easily overload the braid. For example, the resistive power loss of a 20,000 amp current through a one foot braid surpasses 100 kilowatts. Thus, it is not surprising that reliable connections at these current levels have been extremely difficult to achieve.

One effort to alleviate this difficulty involves the provision of two separate current paths, specifically, two separate wire braids. Such a construction is used in 3M's QUICK TERM II shield termination kit (QUICK TERM is a trademark of 3M), which is depicted in FIG. 2. In this design, two braids or straps 7 and 8 are first laid along opposite sides of the cable. One end of braid 7 is fully wrapped around the first shield section 3 (i.e., at least 360°). The other end of braid 7 is draped over the splice and connected to the second shield section 3' by fastening assembly 9. The second braid 8 is then wrapped over the first braid; in other words, there is no direct contact between braid 8 and shield 3. The other end of braid 8 is similarly draped over the splice and connected to shield 3' by another fastening assembly 9. The wrappings may be held in place by a constant force spring.

Theoretically, this construction would split the current between the two electrical paths, which would significantly reduce the destructive power loss. Unfortunately, however, this does not always occur in practice. For high level fault currents, the relationship of the impedance ratio of the two paths, to the current densities, is not necessarily linear. In other words, if the path through braid 8 is only slightly more resistive than that through braid 7, then much more current will flow through braid 7 than through braid 8. Of course, the path through braid 8 is more resistive, simply due to the fact that it is wrapped over braid 7, meaning that a failure in braid 7 is likely to occur, which could eventually lead to a complete failure of the shield connection.

In this regard, wrapping braid s directly against shield 3 (rather than around braid 7), does not overcome this problem, since this necessarily implies that the total length of braid 8 would be different from the total length of braid 7 and, accordingly, the impedances would also be different. This phenomenon may be intuitively understood by perceiving that, once an initial current path has been established in one of the braids, that path is preferred for the brief duration of the surge. It would, therefore, be desirable and advantageous to devise a method and apparatus which would overcome the above-mentioned limitations and minimize excess current densities across the shield connection.

SUMMARY OF THE INVENTION

The foregoing objective is achieved in a cable shield connector comprising a single braid which is partially wrapped around the first cable shield, with both ends of the braid being connected across the splice to the shield on the second cable. The braid is initially centered under the cable to be spliced. The ends are pulled evenly around the first cable shield, and folded over ninety degrees to lie parallel with the cable. A constant force spring holds the central portion of the braid in the wrapped position around the first shield. The ends are then connected to the second cable shield at equal distances from the first shield. The provision of two "tails" from a single braid causes the current to split nearly evenly into two parts, and allows the current to enter or exit the shields at different locations. This forces the current flow under the current density limit of the shield and braid.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PREFERRED EMBODIMENT

Figure 3:
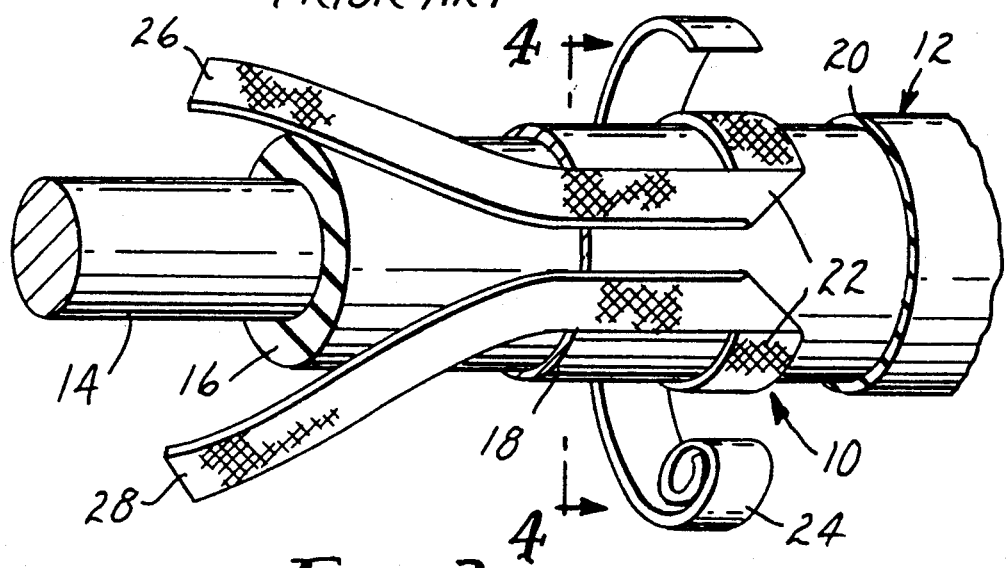
FIG. 3 is a perspective view of a conventional power cable illustrating use of a conductive braid as taught by the present invention.

With reference now to the figures, and in particular with reference to FIG. 3, there is depicted the cable shield connector 10 of the present invention, as applied to an in-line splice of a conventional power cable 12. As discussed above, cable 12 includes a central conductive (e.g., aluminum) core 14, a primary insulating layer 16, a grounding shield layer 18, and an outer cable jacket 20. Cable shield connector 10 is generally comprised of a wire braid 22 and securing means 24. Wire braid 22 may be constructed of any electrically conductive material, and is preferably a flat mesh formed of tin-plated copper wires. A flat strip of soft copper may alternatively be used. Securing means 24 is preferably a constant force spring which facilitates electrical connection between braid 22 and shield 18 Braid 22 may be used with most types of shields, e.g., longitudinally corrugated shields, spirally wound tape shields, braided shields, or flat strap type shields.

Although wire braids and constant force springs are known in the prior art, the technique described herein for their use is both novel and advantageous. After the splice connection has been made across core 14 Of cable 12 (no such connection may be necessary if the splice is only repairing a fault in the shield layer) and primary insulating layer 16 is restored, braid 22 is centered under cable 12, and the ends 26 and 27 are brought up evenly along either side. The ends are folded approximately 90° and laid parallel to cable 12. Braid 22 should preferably be wrapped at least 270° around shield 18 (although a smaller wrap is acceptable), but it is most preferable to have the folds as close together as possible to avoid direct contact between spring 24 and shield 18. However, sufficient space should preferably be allowed between the folds to avoid contact therebetween.

Figure 4:
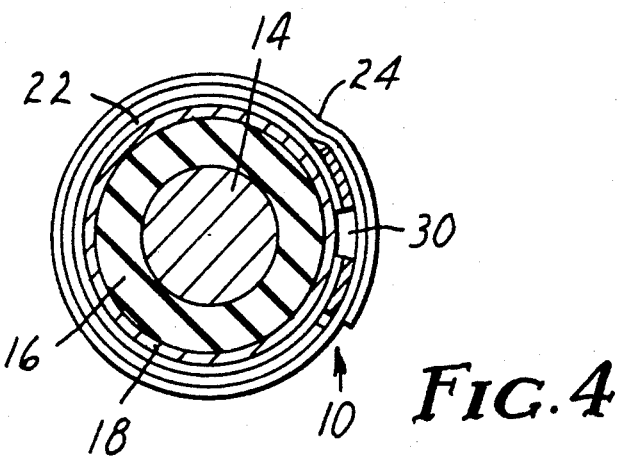
FIG. 4 is a cross-sectional side view of the cable shield connector of the present invention held in place by a constant force spring.

With further reference to FIG. 4, the central portion of braid 22 is secured to shield 18 by constant force spring 24. Other securing means may be used for this purpose, such as a circular clamp, but a constant force spring is deemed preferable since it promotes full contact between braid 22 and shield 18, which minimizes 24 also expands and contracts with cable 12 during temperature variations. The resulting space 3o between shield 18 and spring 24 may be filled with an insulating (dielectric) grease. This completes connection of braid 22 to the first cable shield section.

Figure 1:
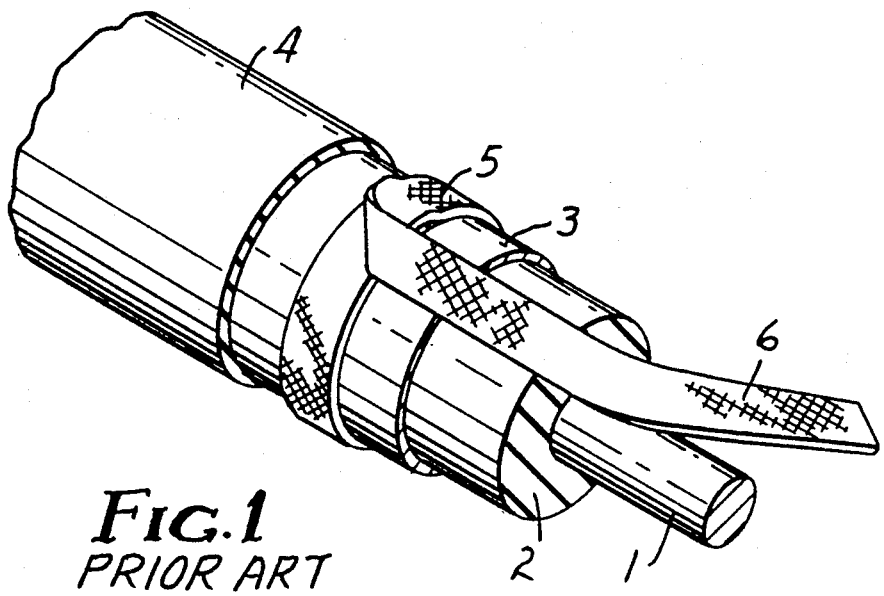
FIG. 1 is a perspective view of a prior art braid connector applied to a conventional power cable.
Figure 2:
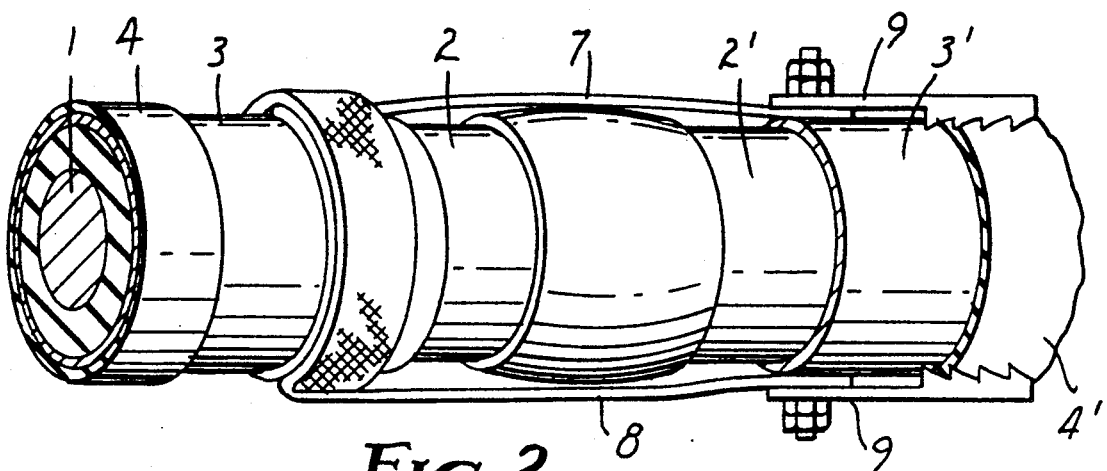
FIG. 2 is a perspective view of a dual braid prior art shield connection.
Figure 5:
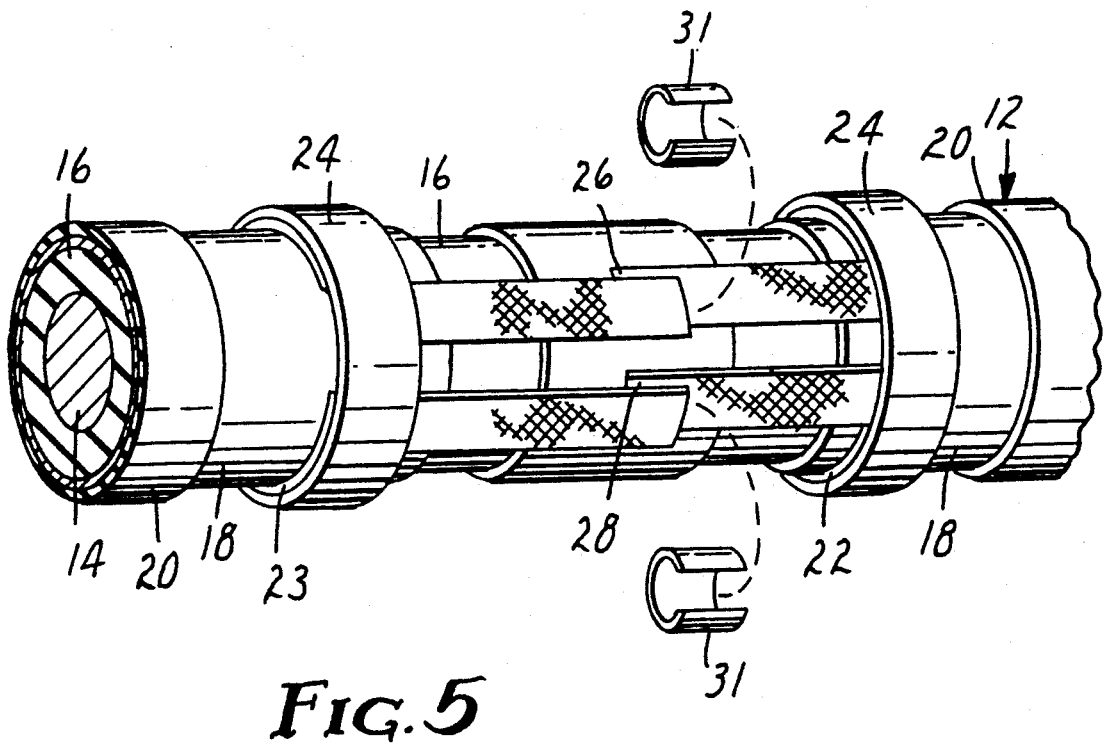
FIG. 5 is a perspective view of the connection of two conductive braids as taught by the present invention.

Ends 26 and 27 may be connected to the second cable shield by means of fastening assemblies similar to that shown in FIG. 2. See U.S. Pat. No. 3,778,749 issued to H. Kapell on Dec. 11, 1973, for details of that fastening assembly. It is preferable, however, to utilize a second braid 23 as shown in FIG. 5. Second braid 23 is installed onto cable shield 18 in the same manner described above, viz., with another constant force spring 24. The "tails" of braid 22 are then connected to the tails of braid 23. This may be accomplished by any convenient means, and particularly by crimp connectors, such as an in-line sleeve, a split bolt connector, or the C-shaped crimp connectors 31 depicted in FIG. 5. A single crimp connector could connect all four tails together, and would also provide the advantages described herein.

If a second braid 23 is used as described above, then the two current paths through the tails are approximately the same length since they coextend between the constant force springs 24. If, however, a second braid is not used (e.g., the fastening assembly of the '749 patent is used instead), then the technician should make sure that the tails of braid 22 are approximately equal in length; if necessary, excess braid at one end, e.g., end 26, may be trimmed so that it is even with end 28. After the shield connection is completed, the entire assembly may be covered with a protective enclosure, such as a polymeric sleeve.

Figure 6:
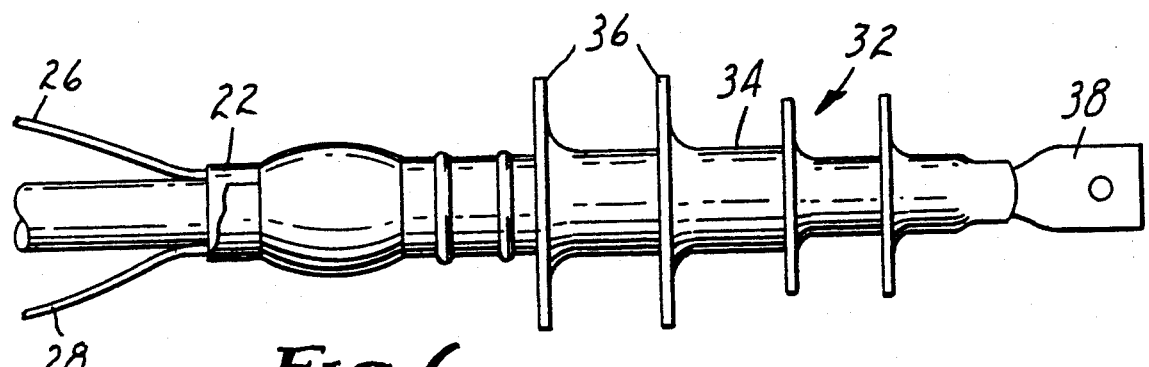
FIG. 6 is a side elevational view of a shield terminator in accordance with the present invention.

Referring now to FIG. 6, a skirted terminator enclosure (terminal insulator) 32 is shown. Skirted terminator enclosure 32 is used to enclose a shielded cable end where the conductive core 14 connects to an aerial line or other power equipment. Terminator enclosure 32 is formed from an insulative pre-stretched tube (PST) 34 which may include a plurality of skirts 36. When in use, skirted terminator enclosure 32 is vertically disposed, and skirts 36 prevent the accumulation of water (during a rainstorm) on the outside of enclosure 32, which might cause premature failure of insulative PST 34 due to surface tracking caused by electrical influences.

When used with a skirted termination, core 14 of cable 12 is connected to a lug 38, and braid 22 is connected to the shield in the same manner as described above. Skirted terminator enclosure 32 is then placed over lug 38 and the braid connection. Now, however, the free ends 26 and 27 of braid 22 are connected to local grounding electrodes. Care should be taken to insure that the lengths of the braid tails (to the grounding electrodes) are still roughly even, so as to provide comparable impedances for current flow.

The advantage of the foregoing construction lies in the provision of two tails from a single braid which causes the current to split nearly evenly into two parts, and allows the current to enter or exit the shields at different locations. This forces the current flow under the current density limit of the shield and braid. Heretofore, this advantage has neither been recognized nor appreciated. In the past, reliable shield connections for 20,000 amp currents have been extremely difficult to achieve. With respect to the present invention, however, testing of this construction at 20,000 amps has shown dramatically improved durability. The braid was not annealed and the shield was not fused. Thus, this method allows for greater fault currents than were previously thought possible.

Although the invention has been described with reference to specific embodiments this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. A device for electrically connecting a first conductive member to a second conductive member, comprising:

first strap means having a central portion which is curved for placement against the first conductive member, said first strap means being folded approximately 90° at two points to form two generally parallel tails;

means for securing said central portion of said first strap means to the first conductive member; and means for fastening said tails to the second conductive member.

2. The device of claim 1 wherein said tails are approximately the same length.

3. The device of claim 1 wherein said first strap means comprises a generally flat wire braid.

4. The device of claim 1 wherein said securing means comprises a constant force spring.

5. The device of claim 1 wherein said fastening means comprises:

second strap means having a central portion which is curved for placement against the second conductive member, said strap means being folded approximately 90 at two points to form two generally parallel tails extending toward said tails of said first strap means;

first crimp means for connecting a first one of said tails of said first strap means to a first one of said tails of said second strap means; and second crimp means for connecting a second one of said tails of said first strap means to a second one of said tails of said second strap means.

6. In a splice connection of a cable having a grounding shield layer which has been cut into first and second sections, a cable shield connector comprising:

a first conductive strap having a central portion, said central portion being wrapped at least 270° around the first shield section, said strap further being folded approximately 90° at two points, forming two generally parallel tails;

means for securing said central portion of said strap to the first shield section; and means for fastening said tails to the second shield section.

7. The device of claim 6 wherein said tails are approximately the same length.

8. The device of claim 7 wherein said strap comprises a flat strip of soft copper.

9. The device of claim 7 wherein said strap comprises a flat mesh formed of metallic wires.

10. The device of claim 9 wherein said securing means comprises a constant force spring.

11. The device of claim 10 wherein said fastening means comprises:

a second conductive strap having a central portion which is wrapped at least 270° around the second shield section, said second strap further being folded approximately 90 at two points, forming two generally parallel tails which extend toward said tails of said first strap;

first crimp means for connecting a first one of said tails of said first strap to a first one of said tails of said second strap; and second crimp means for connecting a second one of said tails of said first strap to a second one of said tails of said second strap.

12. A cable shield connection for high fault currents, comprising:

a cable having grounding shield layer surrounded by an outer cable jacket, a portion of said outer cable jacket being removed to expose said shield layer, and said shield layer further having first and second sections;

a first flat, conductive wire braid wrapped at least 270° around said first shield section, said first braid being folded approximately 90° at two points, forming two generally parallel tails of approximately equal length;

a first constant force spring securing said first braid to said first shield section;

a second flat, conductive wire braid wrapped at least 270° around said second shield section, said second braid being folded approximately 90° at two points, forming two generally parallel tails of approximately equal length which extend toward said tails of said first braid;

a second constant force spring securing said second braid to said second shield section;

first crimp means for connecting a first one of said tails of said first braid to a first one of said tails of said second braid;

second crimp means for connecting a second one of said tails of said first braid to a second one of said tails of said second braid; and means for enclosing said exposed shield layer, said first and second braids, said first and second constant force springs, and said crimp means.

13. A method of connecting first and second shield sections of a cable having a grounding shield layer surrounding by an outer cable jacket, a portion of the outer cable jacket having been removed to expose the shield layer, and the shield layer further having been separated into the first and second sections, the method comprising the steps of:

centering a first flat wire braid under the cable, transversely thereto and proximate the first shield section;

pulling the ends of said braid evenly around the first shield section and folding said ends 90°, thereby forming two generally parallel tails not in direct contact with one another;

securing said braid to said first shield section with a constant force spring; and fastening said ends of said braid to the second shield section at approximately equal distances from the first shield.

14. The method of claim 13 wherein said fastening step is accomplished by:

placing a second flat wire braid under the cable, transversely thereto and proximate the second shield section;

pulling the ends of said second braid evenly around the second shield section and folding said ends 90°, thereby forming two generally parallel tails extending toward said tails of said first braid, said tails of said second braid not being in direct contact with one another;

securing said second braid to said second shield section with another constant force spring; and connecting said tails of said first braid to said tails of said second braid.

15. The method of claim 13 further comprising the step of placing a protective enclosure around the first and second shield sections, said braid, and said constant force spring.

* * * * *